April 20, 1937.  J. W. LOGAN, JR  2,077,944
RETARDATION CONTROLLED BRAKE
Filed March 12, 1934
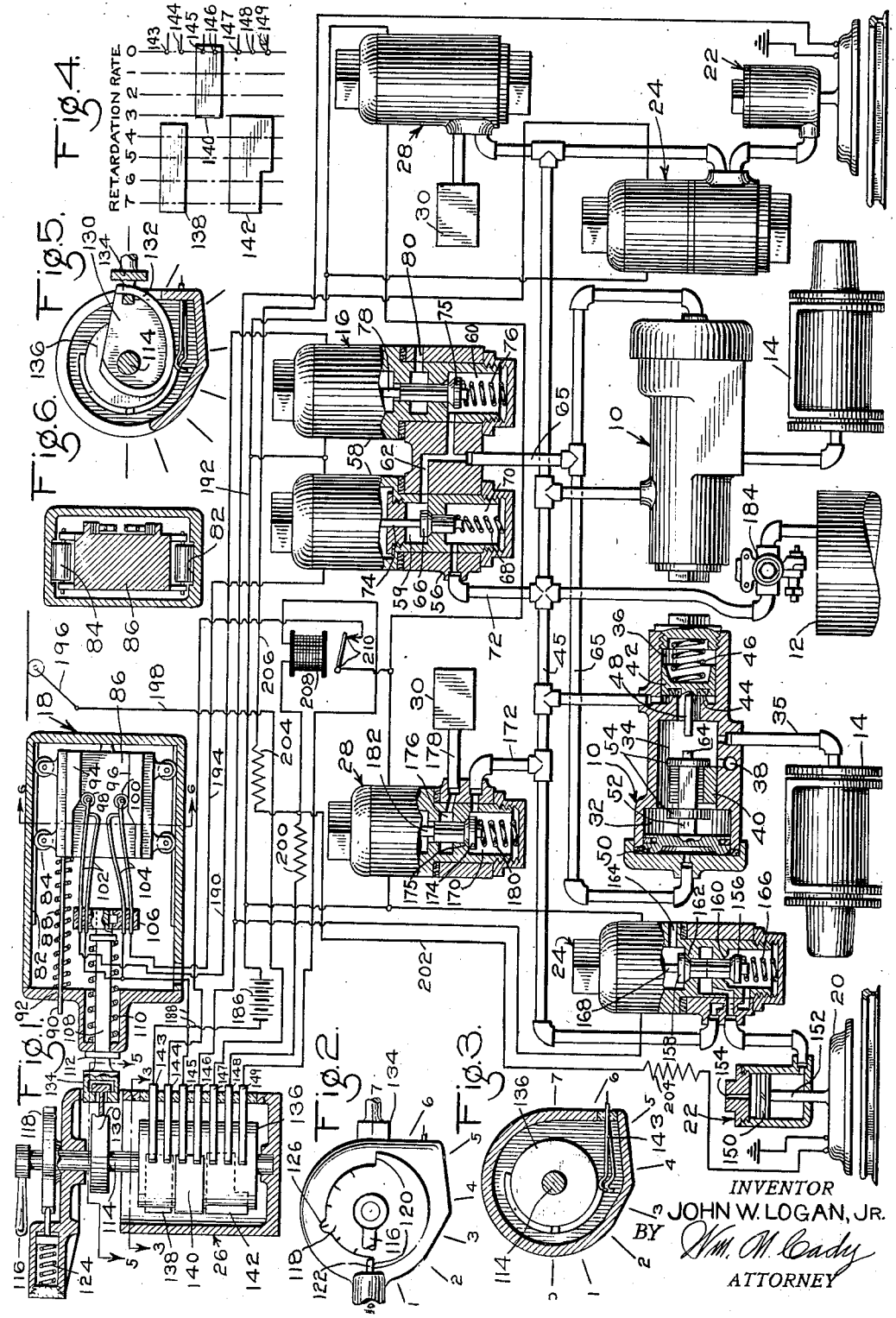
INVENTOR
JOHN W. LOGAN, JR.
BY Wm. M. Cady
ATTORNEY Patented Apr. 20, 1937

2,077,944

UNITED STATES PATENT OFFICE 2,077,944

RETARDATION CONTROLLED BRAKE

John W. Logan, Jr., Wilkinsburg, Pa., assignor to The Westinghouse Air Brake Company, Wilmerding, Pa., a corporation of Pennsylvania Application March 12, 1934, Serial No. 715,097

19 Claims. (Cl. 303—3)

This invention relates to retardation controlled brakes, and more particularly to brakes for railway trains and traction vehicles in which the degree of braking is controlled by selecting different rates of retardation.

In railway trains or vehicles equipped with brakes depending upon the adhesion between wheels and rails to bring the train or vehicle to a stop, the maximum degree of application of the brakes is dependent upon the maximum adhesion between the wheels and rails. For given rail and wheel conditions the brakes may be applied with a given maximum degree, which will bring the train or vehicle to a stop in a given distance. If it is desired to bring the train or vehicle to a stop in a shorter distance, additional braking means must be employed which does not depend upon the adhesion between wheels and rails.

There has heretofore been employed a track shoe brake equipment to supplement the equipment usually employed for braking on the wheels, and such equipment has been very successful in this connection. Such combined equipments have, however, presented some disadvantages in the manner of controlling brake applications. In carrying out my invention, I propose to provide a combined fluid pressure and magnetic shoe brake equipment in which the combined braking action is controlled by a retardation controller device, which is conditioned manually in accordance with a desired rate of retardation.

It will be readily recognized that the combined action of the fluid pressure brakes and the magnetic shoe brakes will not be required for all applications, particularly those for producing relatively low rates of retardation. I, therefore, have provided in my invention means for effecting an application of the fluid pressure brakes only for relatively light applications, and for automatically cutting the magnetic shoe brakes into action for heavy applications.

It is, of course, highly desirable that a unitary control means be provided for controlling applications of both the fluid pressure and magnetic shoe brakes, and in my invention I have provided a single, manually operated control device, providing for the selection of different rates of retardation and for controlling both the fluid pressure and magnetic shoe brake equipments to produce the rate of retardation thereby selected.

Further advantages and objects of my invention will be apparent from the following description of one embodiment thereof, which I have illustrated in the attached drawing, wherein, Figure 1 is a schematic arrangement in diagrammatic form of this embodiment.

Figure 2 is a top plan view of the manually operated control device shown to the left in Figure 1.

Figure 3 is a view along the line 3—3 in Fig. 1 of this device.

Figure 4 is a development of the drum controller embodied in this device.

Figure 5 is a view along the line 5—5 in Fig. 1 of this device.

Figure 6 is a sectional view along the line 6—6 of the retardation controller device shown in Figure 1.

In the embodiment shown, the fluid pressure brake equipment includes relay valve devices 10, for controlling the supply of fluid under pressure from a main reservoir 12 to connected brake cylinders 14. For controlling operation of the relay valve devices, I have provided a magnet valve device 16, and for controlling operation of this magnet valve device I have provided a retardation controller device 18.

The magnetic brake equipment includes a plurality of magnetic track shoes 20, each of which has associated therewith a pneumatically operated raising cylinder 22. For controlling operation of the raising cylinders, I have provided a plurality of magnet valve devices 24.

For controlling the operation of both the fluid pressure brake equipment and the magnetic brake equipment, I have provided a manually operated controller device 26.

In order to operate sanding devices to increase the adhesion between the wheels and rails when high rates of retardation are desired, I have provided a plurality of magnet valve devices 28, each of which is adapted to supply fluid under pressure to operate a sanding device, which I have diagrammatically indicated at 30.

Each of the relay valve devices 10 is embodied in a casing provided with a piston chamber 32, a slide valve chamber 34, and a poppet valve chamber 36.

The slide valve chamber 34 is in communication with the associated brake cylinder through a pipe 35, and is also in communication with the atmosphere through a port and passage 38. Disposed in the slide valve chamber 34 is a slide valve 40 which is adapted to blank the port and passage 38, leading to the atmosphere, at one time and to uncover it at another time.

Disposed in the poppet valve chamber 36 is a poppet valve 42, which is urged toward a seat 44 by a spring 46. This valve has a stem 48 projecting into the slide valve chamber 34, and is adapted to control the flow of fluid from a supply pipe 45, connected with the main reservoir 12, to the slide valve chamber 34, leading to the connected brake cylinder 14.

For actuating the slide valve 40 and the poppet valve 42, there is provided a piston 50 operatively mounted in the piston chamber 32. Secured to the piston is a stem 52 having collars 54 secured thereto and adapted to engage and actuate the slide valve 40 when the piston 50 is caused to move in the piston chamber. The stem 52 is provided with an extension 64 adapted to engage the stem 48 connecting with the poppet valve 42.

The piston 50 is actuated by the supply of fluid under pressure to one side thereof, as will appear presently. When fluid is supplied to one side of the piston, the piston actuates the slide valve 40 to blank off the port and passage 38 leading to the atmosphere, and after this port and passage has been blanked, the extension 64 of the stem 52 engages the poppet valve stem 48 to unseat the poppet valve, to permit fluid under pressure to flow to the connected brake cylinder.

When the pressure supplied to one side of the piston 50 is released to the atmosphere, the pressure in the connected brake cylinder actuates the piston to release position, whereupon the slide valve 40 uncovers the port and passage 38 and fluid pressure in the brake cylinder is released to the atmosphere through this port and passage.

The magnet valve device 16 comprises a valve section 56 and a magnet section 58. The valve section is provided with a supply chamber 59 having communication with a release valve chamber 60 by way of a passage 62. The passage 62 is in communication with the piston chamber 32, to one side of the piston 50 in each of the relay valve devices 10, by way of pipe 65.

Disposed in the supply valve chamber 59 is a supply valve 66, which is urged toward unseated position by a spring 68 in a supply chamber 70 having communication with the aforementioned supply pipe 45, and main reservoir 12, by way of pipe 72.

The supply valve 66 is urged toward seated position by an electromagnet in the magnet section 58, which when energized actuates a stem 74 downwardly to seat the valve. The supply valve 66 thus controls the flow of fluid from the supply pipe 45 to one side of the piston 50 in each relay valve device.

Disposed in the release valve chamber 60 is a release valve 75, which is urged toward seated position by a spring 76. The release valve is urged toward unseated position by an electromagnet in the upper part of the magnet section 58, which when energized actuated a stem 78 downwardly to unseat the valve. When the valve is thus unseated, fluid under pressure may flow from each relay valve chamber 32 to the atmosphere by way of port 80 in the magnet valve device.

The retardation controller device 18 is embodied in a casing having a trackway 82 adapted to receive rollers 84 secured to and providing for movement of a body 86.

The body 86 is normally urged to a biased position to the right by a spring 88 concentrically disposed on a rod 90, which has one end thereof secured to the body 86 and the other end thereof slidably interfitting with a bore 92 in the casing of the retardation controller device.

The body 86 has secured thereto cam members 94 and 96 which are adapted to engage, respectively, rollers 98 and 100 for opening and closing, respectively, contact elements 102 and 104, for controlling operation of the valves in the magnet valve device 16. The contact elements 102 and 104 are secured to an insulating member 106, which is carried by a plunger 108 supported in the retardation controller housing. The insulating member 106 is adapted to insulate the elements making up the contacts 102 and 104 from each other and from the plunger 108.

The plunger 108 is urged to a biased position to the right by a spring 110, an annular shoulder 112 being provided on the plunger to limit this movement to the right.

The cam elements 94 and 96 are each provided with high and low portions, so that when the plunger 108 is urged to its extreme right hand position the rollers 98 and 100, associated with the contacts 102 and 104, engage the high portion of these cams.

When the plunger 108 is actuated to the left, as will appear presently, the roller 98 rolls off the high portion of the cam member 94 onto the low portion thereof, before the roller 100 has rolled off the high portion of the cam member 96. When these rollers roll off the high portion of their respective cam members, the resiliency of the elements forming the contacts 102 and 104 cause the contacts to open, for a purpose which will appear presently.

The controller device 26 is embodied in a casing provided with an operating shaft 114 having a handle 116 secured thereto for manually rotating the shaft. Secured to an upper part of the shaft is a disc 118 having a high peripheral portion and a low peripheral portion, which are connected by shoulders 120 serving as stops for a pin 122 urged into contact with the low peripheral portion by a spring 124. The low peripheral portion is provided with a raised notch 126 for a purpose which will appear presently.

For operating the contact carrying plunger 108, to position the contacts 102 and 104 of the retardation controller device with respect to the body 86 in accordance with movement of the handle 116, there is secured to the operating shaft 114 a cam 130 provided with a peripheral flange 132 engaging a T-slot in a head portion 134 integral with the plunger 108.

When the handle 116 is rotated in a counterclockwise direction, the cam 130 draws the plunger 108 to the left, thereby positioning the contacts 102 and 104 in various positions to the left with respect to the body 86.

Also secured to the operating shaft 114 is a drum 136 having secured thereto and insulated therefrom, and from each other, segmental contact members 138, 140 and 142. These segmental contact members have a relative position on the drum 136 as is diagrammatically shown in the developed view in Fig. 4.

For contacting these segmental members, there are provided a plurality of fingers 143 to 149 inclusive. As may be seen from Fig. 4, and as will hereinafter be more fully described, certain of the fingers engage each of the segmental contact members for a portion of the rotational movement of the drum.

The magnetic track shoes 20 may be of any of the usual types, and I do not, therefore, desire to be limited to any one particular type. Further, any suitable mechanism may be employed for raising and lowering the track shoes by operation of the raising cylinders 22.

The raising cylinders 22 may be each embodied in a casing provided with a chamber in which is disposed an operating piston 150 adapted to raise a track shoe, as by a piston rod 152. Fluid under pressure is supplied to the under side of the piston to effect the raising of the shoe, while the chamber on the upper side of the piston is vented to the atmosphere, as by a passage 154, so that when fluid pressure is released from the piston chamber the shoe may drop to engage the track.

The supply of fluid under pressure to each of the chambers to cause raising of the shoe is controlled by one of the aforementioned magnet valve devices 24. Each of these magnet valve devices is embodied in a casing provided with a supply valve 156 and a release valve 158. The supply valve 156 cooperates with a seat 160 to control the flow of fluid from the supply pipe 45 to the chamber of the raising cylinder 22, while the release valve 158 cooperates with a seat 162 to control the release of fluid pressure from the piston chamber to the atmosphere, by way of port 164.

The supply valve 156 is urged toward seated position and the release valve 158 toward unseated position by a spring 166. The supply valve 156 is urged toward unseated position and the release valve 158 toward seated position by an electromagnet in the upper part of the casing, which when energized actuates a stem 168 downwardly to seat the release valve and unseat the supply valve.

The magnet valve devices 28 control the supply of fluid under pressure to the sanding devices 30, which may be of any of the usual types, and I have therefore indicated the devices diagrammatically.

Each magnet valve device 28 is embodied in a casing provided with a valve chamber 170, which is in communication with the supply pipe 45 by pipe 172. Disposed in the chamber 170 is a valve 174, which cooperates with a seat 175 to control the flow of fluid from the pipe 45 to a chamber 176 connecting with a sanding device 30 by pipe 178.

The valve 174 is urged toward seated position by a spring 180 and to unseated position by an electromagnet in the upper part of the casing, which when energized actuates a stem 182 downwardly to unseat the valve.

Between the supply pipe 45 and the main reservoir 12 I have shown a feed valve device 184, for the purpose of maintaining a stabilized pressure in the supply pipe. This valve device may be of any of the usual types employed for this purpose, and I do not therefore desire to be limited to any specific type.

In operation, the operator effects an application of the brakes by selecting a desired rate of retardation. The disc 118, or a plate conveniently located with respect to the handle 116, may be graduated to indicate rates of retardation, such, for example, as is diagrammatically indicated in Figs. 2, 3, 4 and 5. As there shown, the numerals 1 to 7, inclusive, indicate rates of retardation in miles per hour per second.

When the vehicle is running, therefore, the operator maintains the control handle 116 in the position corresponding to zero rate of retardation, that is, release position. In this position, and assuming that the vehicle is traveling on a level trackway, the body 86 of the retardation controller device is in its extreme position to the right, and the rollers 98 and 100 are in engagement with the high portions of the cam members 94 and 96, respectively.

Contacts 102 and 104 are therefore closed. The closed contacts 102 maintain the electromagnet controlling the release valve 75, of the magnet valve device 16, energized from a convenient source of supply, such for example, as a battery 186, through a circuit including conductor 188, contacts 102, conductor 190, the release electromagnet in the magnet valve device 16, and conductor 192 leading to the battery 186.

With contacts 104 closed, the electromagnet controlling the supply valve 66 is energized from the battery 186 through a circuit including conductor 188, contacts 104, conductor 194, the electromagnet in the valve device 16, and conductor 192 leading to the battery 186.

Energization of these electromagnets cuts off the supply of fluid to the relay valve devices 10 and maintains them in release position.

With the handle 116 in zero or release position, the fingers 145 and 146 are connected through the segmental contact member 140, to energize the electromagnets in the magnet valve devices 24, through the circuit as shown in the drawing. The supply valve 156 and release valve 158 of each of these magnet valve devices are, therefore, positioned as shown in Fig. 1, so that fluid under pressure is supplied to each of the raising cylinders 22 to maintain the magnetic track shoes 20 in raised position.

At the same time, the electromagnet in the magnet valve device 28 controlling operation of the sanding device 30 is deenergized, so that its valve 175 is held in seated position by the spring 180.

Now when it is desired to effect an application of the brakes, the operator moves the controller handle 116 in a counter-clockwise direction to select a rate of retardation in accordance with the desired degree of braking. When the handle 116 is thus moved, the cam 130 secured to the operating shaft 114 actuates the plunger 108 to the left, causing the roller 98 to first roll off the high portion of the cam 94 and the roller 100 to subsequently roll off the high portion of the cam member 96.

When roller 98 rolls off the high portion of the cam 94, contacts 102 are opened to deenergize the release electromagnet in the magnet valve device 16, whereupon spring 76 seats the release valve 75.

When roller 100 rolls off the high portion of the cam member 96, contacts 104 are opened to deenergize the application electromagnet in the magnet valve device 16, whereupon spring 68 unseats the valve 66, and fluid under pressure flows from the supply pipe 45, past the unseated valve 66 to the passage 62, and from thence through pipe 65 to the face of piston 50 in each relay device 10.

Each piston 50 then actuates its connected slide valve 40 to blank off exhaust port and passage 38, and to cause extension 64 of the stem 52 to engage the stem 48 to unseat the poppet valve 42. Unseating of each poppet valve 42 permits fluid under pressure to flow from the supply pipe 45, and the main reservoir 12, to the brake cylinder 14. With fluid supplied to the brake cylinders, the brakes are thus applied in accordance with the build up of pressure therein.

If the operator selects a rate of retardation equal to or less than some chosen value, as for example, three miles per hour per second, or under, then the fluid pressure brakes only are brought into operation.

As the vehicle begins to decelerate under the retarding effect of the application of the brakes, the body 86 of the retardation controller device will move to the left. When the body has moved a sufficient distance, the roller 100 will roll onto the high part of the cam member 96, and thereby energize the electromagnet in the magnet valve device 16 controlling the supply valve 66. The supply valve 66 will thus be seated, thereby cutting off the supply of fluid to the relay valve devices 10.

With the flow of fluid to the relay valve devices cut off, the pressure in the brake cylinders, and hence that in the slide valve chamber 24 of each valve device, will soon reach a value such that the pressure acting upon the back side of each piston 50 will overbalance that acting upon the face of each piston, and the pistons will be moved toward release position until each poppet valve 42 is seated. The supply of fluid to the brake cylinders will then be lapped.

If the fluid pressure supplied to the brake cylinders is sufficient to cause a rate of retardation greater than that selected by movement of the handle 116, then the body 86 will move far enough to the left to cause the roller 98 to roll onto the high part of the cam member 94. When this takes place contacts 102 will be closed to effect energization of the release electromagnet to unseat the release valve 75.

Unseating of this valve will release fluid pressure from the relay valve devices 10 to cause each piston 50 to move further to the left until the slide valves 40 have uncovered the exhaust port and passages 38, whereupon fluid pressure will be released from the brake cylinders to the atmosphere. This will, of course, take place until the rate of retardation has been reduced to the point where the body 86 is caused to move toward the right to effect seating of the release valve 75.

When sufficient pressure has been released from the brake cylinders so that the pressure on the face of each piston 50 overbalances that on the back side of the piston, then the slide valves 40 will blank off the exhaust port and passages 38 and the pressure in the brake cylinders will again be lapped.

It will thus be obvious that the body 86 of the retardation controller device will move back and forth, according to the changes in the rate of retardation produced by application of the brakes, to so control the magnet valve device 16 to maintain a pressure in the brake cylinders which will produce the rate of retardation selected by movement of the controller handle 116.

If, in the specific embodiment shown, a rate of retardation higher than three miles per hour per second is desired, the controller handle 116 is moved until the pin 122 passes over the raised notch 126 on the disc 118. As this takes place, fingers 145 and 146 pass off the segmental contact 140 and are thereby disconnected. The electromagnets in the magnet valve devices 24 are then deenergized to effect seating of the supply valves 156 and unseating of the release valves 158. The supply of fluid to the raising cylinders 22 is thereby cut off and fluid pressure in the cylinders is released to the atmosphere, permitting the magnetic track shoes 20 to drop to and engage the track.

At the same time, fingers 147, 148 and 149 of the controller engage the segmental contact member 142, forming a circuit from a source of power supply, through a trolley 196, to each of the magnetic track shoes, by way of conductor 198, fingers 147 and 148, and a resistance device 200, from whence the circuit branches, one branch leading to the left hand magnetic shoe by way of conductor 202 and another resistance device 204, and another branch leading to the right hand magnetic shoe through a like resistance 204 and conductor 206.

The two resistance devices 204 are provided to hasten the build up of current in the windings of each of the magnetic shoes, while the resistance device 200 is provided for a purpose which will appear presently.

For rates of retardation greater than three miles per hour per second, then, both the fluid pressure brakes and the magnetic shoe brakes are cut into action. Since the retardation controller device 18 functions according to the rate of retardation selected, it will control the supply of fluid to the fluid pressure brakes to vary the braking effect produced thereby, so that the combined braking effect of the magnetic shoes and the fluid pressure brakes will be only that required to maintain the selected rate of retardation.

This will be obvious from noting that the plunger 108 carrying the contacts 192 and 104 is positioned with respect to the body 86 according to the movement of the handle 116, the cam 130 being properly designed to effect this.

When the track shoes are cut into action, fingers 143 and 144 engage the segmental contact member 138, whereupon a circuit is formed from the battery 186 to the electromagnets of the magnet valve devices 28, through contacts 210 of a relay 208. These electromagnets will not, however, be energized at this time, as relay 208 is shunted across the resistance device 200, and has become energized due to the flow of current to the track shoes, to open its contact 210 to prevent current being supplied to the electromagnets.

If, however, a rate of retardation greater than a chosen value, as for example, approximately 5.5 miles per hour per second, is selected, then finger 149 is disengaged from the segmental contact member 142, so that relay 208 is no longer shunted across the resistance device 200, and the relay, therefore, does not open its contacts 210. The magnet valve devices 28 are then energized to unseat their valves 174, and fluid flows from the supply pipe 45 to the sanding devices 30. The sanding devices operate to deposit sand on the track to increase the adhesion, both between the vehicle wheels and rails and between the track shoes and rails.

If for movements of the controller handle 116 to positions selecting rates of retardation higher than three miles per hour per second, the magnetic track shoe brakes should fail to respond, as would happen in case of loss of power, or broken circuit, then the retardation controller device will so control the magnet valve device 16 as to permit higher pressures to be built up in the brake cylinders, so that the desired rate of retardation may be realized.

When it is desired to effect a release of the brakes, the handle 116 is moved to release, or zero rate of retardation, position. In this position the magnetic shoes are entirely disconnected from the source of power supply, and the contacts 192 and 104 of the retardation controller device are positioned with respect to the body 86 so as to effect a full release of pressure from the brake cylinders.

It will thus be seen that I have provided an improved combined track shoe and fluid pressure brake apparatus in which the fluid pressure brake equipment is employed for a rate of retardation up to a chosen value, and for rates higher than this chosen value, both the track shoe and fluid pressure brakes are employed. It will also be apparent that either a service or an emergency application of the brakes may be effected by choosing a rate of retardation accordingly.

In a brake equipment of this type, effective braking of the vehicle is not alone dependent upon the adhesion between the vehicle wheels and rail, except in case of failure of power to operate the track shoe brakes. Such a brake apparatus, therefore, provides a high order of reliability, and in addition the danger of wheel sliding is greatly minimized.

While I have illustrated my invention by one embodiment thereof, it will be apparent that many modifications may be made and I do not intend to be limited merely to the embodiment shown, or otherwise than by the spirit and scope of the appended claims.

Having now described my invention, what I claim as new and desire to secure by Letters Patent, is:

1. In a vehicle brake apparatus, the combination with a brake cylinder, of a valve device operable to control the supply of fluid under pressure to and its release from the brake cylinder, electro-responsive means having electromagnets operable to control the operation of said valve device, control means including an inertia device coacting with and movable with respect to two sets of manually positionable contacts adapted to control said electromagnets, and means whereby for release position of said control means said contacts are closed to energize said electromagnets and for application position of said control means said contacts are opened to deenergize said electromagnets.

2. In a vehicle brake apparatus, the combination with a magnetic track shoe device, of electro-responsive means for controlling operation of a sanding device, manually operated means for controlling said electro-responsive means, and relay means responsive to current supplied to said shoe device for preventing energization of said electro-responsive means for one position of said manually operated means and providing for energization for another position of said manually operated means.

3. In a vehicle brake system, the combination with a brake cylinder and a magnetic track brake device, of a manually operated control element having a release position and movable to different application positions to control applications of the brakes according to a desired rate of retardation, a retardation controller device having an inertia operated body and movable contacts adapted to be operated by said body, means responsive to movement of said control element for positioning said contacts away from said body a distance corresponding to a rate of retardation selected by movement of said control element, means responsive to initial movement of said contacts by said control element for effecting a supply of fluid under pressure to said brake cylinder and operable to control said supply according to operation of said contacts by said body, and means responsive to movement of said control element in selecting a predetermined rate of retardation for cutting said magnetic track shoe device into action, whereby said retardation controller device is caused to control said supply to said brake cylinder so that the combined braking effect of said brake cylinder and track shoe device produces the rate of retardation selected.

4. In a vehicle brake system, the combination with a brake cylinder and a magnetic track shoe device, of two normally closed circuits, means responsive to opening and closing of said two circuits for controlling the supply of fluid under pressure to and its release from said brake cylinder, normally closed contacts in each of said two circuits, said contacts having a biased position and being opened upon movement away from said biased position, a third normally closed circuit, means operated upon opening of said third circuit for cutting said track shoe device into action, a manually operated control element having a release position and movable through an application zone for controlling applications of the brakes, means for moving said normally closed contacts away from said biased position a distance corresponding to the degree of movement of said control element in said application zone, means responsive to a predetermined degree of movement of said control element in said application zone for opening said third circuit, and an inertia operated body operated according to the rate of retardation of the vehicle produced by the combined braking effect of said brake cylinder and track shoe device for operating said contacts to maintain a rate of retardation corresponding to the positioning of said contacts.

5. In a vehicle brake apparatus, in combination, a magnetic track shoe device, a circuit for supplying current to said device, a resistance device in said circuit, electroresponsive means for controlling operation of a sanding device, a second circuit for supplying current to operate said electroresponsive means, a controller device operable to a certain position to supply current to both of said circuits, a relay connected across said resistance device and operable when current flows in said resistance device to open said second circuit, and means responsive to movement of said controller device to another position for deenergizing said relay to effect closing of said second circuit.

6. In a vehicle brake apparatus, in combination, a brake cylinder, a magnetic track shoe device, a valve device operable to control the supply of fluid under pressure to and its release from said brake cylinder, electroresponsive means for controlling operation of said valve device, a manually operated control element having a release position and movable to different application positions, means responsive to initial movement of said control element for effecting operation of said electroresponsive means to effect a supply of fluid under pressure to said brake cylinder, means rendered operable after a predetermined movement of said control element for cutting said track shoe device into operation, sanding control means, means responsive to another predetermined movement of said control element for effecting operation of said sanding means, and means operated according to the rate of retardation of the vehicle produced by the supply of fluid under pressure to said brake cylinder and operation of said track shoe device for controlling said electroresponsive means to effect a rate of retardation corresponding to the movement of said control device to application position.

7. In a vehicle brake system, in combination, fluid pressure brake means, magnetic track brake means, a controller device operable to control operation of said fluid pressure brake means and said magnetic track brake means, said controller device having a release position and operable to different application positions, means responsive to operation of said controller device to any application position for effecting a supply of fluid under pressure to said fluid pressure brake means, and means for preventing operation of said magnetic track brake means until said controller device has been operated to a predetermined application position corresponding to a chosen operation of said fluid pressure brake means.

8. In a vehicle brake system, in combination, fluid pressure brake means, electrical brake means, control means operable to control operation of said fluid pressure brake means and said electrical brake means, said control means having a release position and being operable to different application positions, means responsive to operation of said control means to any application position for effecting a supply of fluid under pressure to said fluid pressure brake means, means for preventing operation of said electrical brake means until said control means has been operated to a predetermined application position corresponding to a chosen operation of said fluid pressure brake means, and means governed by the rate of retardation of the vehicle for modifying operation of the means responsive to operation of the control means to limit the combined braking effect produced by said two brake means.

9. In a vehicle brake system, in combination, fluid pressure brake means, electrical brake means, a controller device operable to control operation of said fluid pressure brake means and said electrical brake means, said controller device having a release position and being operable to different application positions, means responsive to operation of said controller device to any application position for effecting a supply of fluid under pressure to said fluid pressure brake means, means governed by the rate of retardation of the vehicle for subsequently controlling the supply of fluid under pressure to said fluid pressure brake means, means for manually adjusting at will said last means to vary at what rate of retardation said last means is operable, and means for preventing operation of said electrical brake means until said controller device has been operated to a predetermined application position corresponding to a chosen operation of said fluid pressure brake means.

10. In a vehicle brake system, in combination, fluid pressure brake means, electrical brake means, a controller device operable to control operation of said fluid pressure brake means and said electrical brake means, said controller device having a release position and being operable to different application positions, means responsive to operation of said controller device to the different application positions for effecting a variable supply of fluid under pressure to said fluid pressure brake means and for effecting a supply of current to said electrical brake means, said supply of fluid under pressure being continuously increased as said control device is progressively operated to different application positions, and means responsive to the rate of retardation of the vehicle for modifying operation of the means responsive to operation of the controller device for limiting the combined braking effect produced by said two brake means.

11. In a vehicle brake system, in combination, fluid pressure brake means, electrical brake means, control means operable to control operation of said fluid pressure brake means and said electrical brake means, said control means being operable to different application positions to vary the degree of application of both of said two brake means, a control element movable to different operating positions, and means governed by the rate of retardation of the vehicle for limiting the degree of application of one of said brake means so that the combined braking effect of said two brake means will produce a rate of retardation corresponding to the degree or extent of movement of said control element.

12. In a vehicle brake system, in combination, a magnetic track shoe device, a brake cylinder, a manually operated controller device operable to different application positions to effect a supply of fluid under pressure to said brake cylinder and a supply of current to said shoe device, a retardation controller device operated according to the rate of retardation of the vehicle, means operated in response to operation of said retardation controller device for controlling the supply of fluid under pressure to said brake cylinder, and means for adjusting the setting of said retardation controller device according to operation of said manually operated controller device, whereby the rate of retardation produced by operation of said magnetic track shoe and said brake cylinder is limited according to the setting of said retardation controller device.

13. In a vehicle brake system, in combination, a track shoe device, a brake cylinder, electroresponsive means for controlling the lowering of said track shoe device into engagement with the track rail, contacts operable to control energization and deenergization of said electroresponsive means and for controlling the supply of current to said track shoe device, manually operated means for operating said contacts, a valve mechanism for controlling the supply of fluid under pressure to said brake cylinder, and means for remotely controlling said valve mechanism in accordance with operation of said manually operated means.

14. In a vehicle brake system, in combination, a track shoe device, a brake cylinder, means operative by the supply of fluid under pressure thereto for maintaining said track shoe device suspended above the track rail and operated upon the release of fluid under pressure therefrom for permitting said track shoe device to drop by gravity to engagement with said track rail, electroresponsive means for controlling the supply of fluid under pressure to and its release from said first means, a brake valve device for controlling the supply of fluid under pressure to and its release from said brake cylinder, and a controller device manually operable from a release position to a first application position to operate said brake valve device and then to a second application position to effect operation of said electroresponsive means to effect a release of fluid under pressure from said first means and to also effect a supply of current to said track shoe device.

15. In a vehicle brake system, in combination, a magnetic track shoe device, a brake cylinder, means for controlling operation of a sanding device, a controller device having a release position and being operable manually to a plurality of application positions, means responsive to operation of said controller device to a first application position for effecting a supply of fluid under pressure to said brake cylinder, means responsive to operation of said controller device to a second application position for increasing the supply of fluid under pressure to said brake cylinder and for effecting operation of said magnetic track shoe device, and means responsive to operation of said controller device to a third application position for further increasing the supply of fluid under pressure to said brake cylinder and increasing the application of said magnetic track shoe device and for also effecting operation of said first means to cause the track rail to be sanded by said sanding device.

16. In a vehicle brake system, in combination, a fluid pressure brake, an electric brake, a retardation controller device operative manually to initiate an application of the fluid pressure brake and to select a desired rate of retardation, and responsive to the rate of retardation of the vehicle for controlling the degree of application of the fluid pressure brake so as to limit and regulate the rate of retardation of the vehicle to the rate selected, and manually operative means for manually operating the retardation controller and for controlling the application and release of the electric brake.

17. In a vehicle brake system, in combination, fluid pressure brake means, electrical brake means, control means for controlling operation of said fluid pressure brake means and said electrical brake means, said control means comprising a manually operable element having a release position and a plurality of different application positions successively removed from the release position, means responsive to operation of the manually operable element to any application position for causing fluid under pressure to be supplied to the fluid pressure brake means to effect an application of the brakes, and means effective upon operation of the manually operable element to certain of the application positions farther removed from the release position than the first of the application positions for effecting the application of the electrical brake means.

18. In a vehicle brake system, in combination, fluid pressure brake means, electrical brake means, control means for controlling operation of said fluid pressure brake means and said electrical brake means, said control means comprising a manually operable element having a release position and a plurality of different application positions successively removed from the release position, means responsive to operation of the manually operable element to any application position for causing fluid under pressure to be supplied to the fluid pressure brake means to effect an application of the brakes, means effective upon operation of the manually operable element to certain of the application positions farther removed from the release position than the first of the application positions for effecting the application of the electrical brake means, and means effective according to the rate of retardation of the vehicle for causing said control means to regulate the pressure of fluid supplied to the fluid pressure brake means so as to limit the rate of retardation of the vehicle resulting from the application of the fluid pressure brake means only or both the fluid pressure brake means and the electrical brake means to a selected rate.

19. In a vehicle brake system, in combination, fluid pressure brake means, electrical brake means, control means for controlling operation of said fluid pressure brake means and said electrical brake means, said control means comprising a manually operable element having a release position and a plurality of different application positions successively removed from the release position, means responsive to operation of the manually operable element to any application position for causing fluid under pressure to be supplied to the fluid pressure brake means to effect an application of the brakes, means effective upon operation of the manually operable element to certain of the application positions farther removed from the release position than the first of the application positions for effecting the application of the electrical brake means, means effective according to the rate of retardation of the vehicle for causing said control means to regulate the pressure of fluid supplied to the fluid pressure brake means so as to limit the rate of retardation of the vehicle resulting from the application of the fluid pressure brake means only or both the fluid pressure brake means and the electrical brake means to a selected rate, and means controlled by the degree to which the said manually operable element is moved out of release position into the application positions for varying the limit of rate of retardation effected by said last means.

JOHN W. LOGAN, Jr.